(12) United States Patent
Emaru et al.

(10) Patent No.: US 8,108,639 B2
(45) Date of Patent: Jan. 31, 2012

(54) STORAGE SYSTEM, METHOD FOR CALCULATING ESTIMATED VALUE OF DATA RECOVERY AVAILABLE TIME AND MANAGEMENT COMPUTER

(75) Inventors: Hironori Emaru, Yokohama (JP); Nobuhiro Maki, Yokohama (JP); Junichi Hara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 12/379,032

(22) Filed: Feb. 11, 2009

(65) Prior Publication Data

US 2010/0153666 A1 Jun. 17, 2010

(30) Foreign Application Priority Data

Dec. 17, 2008 (JP) ................. 2008-321323

(51) Int. Cl.
*G06F 13/00* (2006.01)
(52) U.S. Cl. .................... 711/162; 711/151
(58) Field of Classification Search .................. 711/151, 711/162
See application file for complete search history.

(56) References Cited

U.S. PATENT DOCUMENTS

| | | | | |
|---|---|---|---|---|
| 7,240,197 B1 * | 7/2007 | Yamagami et al. | ........... | 713/168 |
| 7,353,240 B1 * | 4/2008 | Takamoto et al. | ................... | 1/1 |
| 7,698,374 B2 * | 4/2010 | Ido et al. | ....................... | 709/216 |
| 2002/0103980 A1 | 8/2002 | Crockett et al. | | |
| 2005/0270930 A1 * | 12/2005 | Uemura | ....................... | 369/47.1 |
| 2006/0277384 A1 | 12/2006 | Yagawa et al. | | |
| 2008/0005460 A1 * | 1/2008 | Uemura | ....................... | 711/112 |
| 2008/0209146 A1 | 8/2008 | Imazu et al. | | |

OTHER PUBLICATIONS

European Search Report mailed Apr. 12, 2010.

* cited by examiner

*Primary Examiner* — Reba I Elmore
(74) *Attorney, Agent, or Firm* — Sites & Harbison PLLC; Juan Carlos A. Marquez, Esq.

(57) ABSTRACT

The invention provides a technology applicable to technologies other than a main frame technology and monitors data recovery available time while suppressing a monitoring error within a certain range in a storage system that performs Asynchronous Remote Copy among storage devices. A management computer in the storage system stores latest or quasi-latest management data corresponding to data staying in a buffer of the first storage device with temporal information at certain monitoring intervals, calculates an estimated value of the data recovery available time which is time of data stored in the second storage device corresponding to data stored in the first storage device, based on the temporal information stored, and based on a certain management data among earliest or quasi-earliest management data or a number of the data staying in the buffer at the certain time and displays the estimated value on a display section.

12 Claims, 12 Drawing Sheets

FIG.6

1322 REMOTE COPY DEFINITION TABLE

| PRIMARY SITE | | REMOTE SITE | | |
|---|---|---|---|---|
| STORAGE DEVICE | LOGICAL DISK NUMBER | STORAGE DEVICE | LOGICAL DISK NUMBER | |
| 1300A | LDEV01 | 1300B | LDEV01 | 6010 |
| 1300A | LDEV02 | 1300B | LDEV02 | 6020 |
| 1300A | LDEV03 | 1300B | LDEV03 | 6030 |
| 1300A | LDEV04 | 1300B | LDEV04 | 6040 |
| 1300A | LDEV05 | 1300B | LDEV05 | 6050 |

STATE TRANSITION DIAGRAM OF COPY PAIR

LEGEND: STATE / OPERATION → PERFORMANCE

FIG.8

1124 FLOW-IN SECTION I/O TABLE

| TIME (8100) | SEQUENCE NUMBER (8200) | |
|---|---|---|
| 15:00:00 | 875 | —8010 |
| 15:00:10 | 1000 | —8020 |
| 15:00:20 | 1200 | —8030 |
| 15:00:30 | 1290 | —8040 |
| ⋮ | ⋮ | |
| 15:10:00 | 3745 | —8050 |

FIG.9

1126 FLOW-OUT SECTION I/O TABLE

| TIME (9100) | SEQUENCE NUMBER (9200) | |
|---|---|---|
| 15:10:00 | 1150 | —9010 |

STORAGE SYSTEM, METHOD FOR CALCULATING ESTIMATED VALUE OF DATA RECOVERY AVAILABLE TIME AND MANAGEMENT COMPUTER

CROSS REFERENCE TO RELATED APPLICATIONS

This application claims the foreign priority benefit under Title 35, United States Code, §119 (a)-(d) of Japanese Patent Application No. 2008-321323, filed on Dec. 17, 2008 in the Japan Patent Office, the disclosure of which is herein incorporated by reference in its entirety.

BACKGROUND OF THE INVENTION

1. Field of the Invention

The present invention relates to a technology for monitoring a data recovery available time in a storage system that performs Asynchronous Remote Copy among a plurality of storage devices.

2. Related Art

An importance of nondisruptive business operation and data protection in a business information system is increasing more and more lately due to globalization of a market and due to provision of services 24 hours a day and 365 days a year through Web. However, there exists a lot of risks such as terrorism and natural disasters that possibly lead to disruption and data loss of the business information system.

One of technologies that relieves these risks is Asynchronous Remote Copy in a storage system. The Remote Copy here is a technology of duplicating data by copying data in a certain volume in a storage device to a volume of another storage device.

There are two main types of Remote Copy. One is Synchronous Remote Copy (RCS: Remote Copy Synchronous) of copying the data in real-time as extension of writing in a host and of the other is Asynchronous Remote Copy of copying the data through processing different from the writing in the host. In the case of the Asynchronous Remote Copy, there are also two methods of storing changed data history in a memory (RCA: Remote Copy Asynchronous) and of storing in the memory in combination with a volume (RCD: Remote Copy asynchronous with Disk). The present invention intends the Asynchronous Remote Copy (the both RCA and RCD).

Note that it is said to be preferable to adopt the Asynchronous Remote Copy if a distance between a primary site (a site normally performing business operations) and a remote site (a different site for supporting the business continuity) is distant, e.g., 100 km or more, even though the Synchronous Remote Copy may be adopted naturally if the distance is close, e.g., less than 100 km, in general for convenience of communication performance and the like. That is, assuming a natural disaster such as a huge earthquake beside a terrorism, it is necessary to largely keep the distance between the primary and remote sites and in that case, it is desirable to adopt the Asynchronous Remote Copy.

That is, the use of the Asynchronous Remote Copy allows the remote site to support the business continuity when the primary site is hit by the terrorism, natural disaster or the like even if the distance between the primary and remote sites is distant. To that end, storage devices are provided on the both primary and remote sites in the Asynchronous Remote Copy to deal with the terrorism, natural disaster or the like that is unpredictable when it occurs. Upon that, the Asynchronous Remote Copy realizes the business continuity while minimizing data loss when the primary site is damaged by conforming contents of data stored in the primary and the remote sites as much as possible.

For instance, there has been a practical technology of duplicating contents of a physical volume or logical volume by using the Asynchronous Remote Copy between the storage devices provided in the primary and remote sites and of continuing business operations by using the storage device of the remote site when the primary site is damaged.

When the Asynchronous Remote Copy is carried out, there is a time lag in writing data respectively into the storage devices of the primary and remote sites. Therefore, it is necessary to monitor that data stored in the storage device of the remote site corresponds to data of which point of time in the primary site to be ready for a case when a failure occurs in the primary site. Here, time when the latest data stored in the storage device of the remote site had been written into the storage device of the primary site will be called as data recovery available time with reference to certain time. The lag of time of the data stored in the storage device of the primary site and the storage device of the remote site will be called as a data loss time period.

For instance, assuming that write data issued at 21:00:00 is written into the storage device of the primary site, and assuming that the write data issued at 20:59:20 is written into the storage device of the remote site and no write data is written after that, the data recovery available time is 20:59:20 and the data loss time period is 40 seconds.

US2002/0103980A discloses a technology of monitoring the data recovery available time by utilizing a time stamp (temporal information) embedded by a host into a write I/O (Input/Output) (write request) in a main frame environment.

US2006/0277384A discloses a technology of monitoring the data recovery available time in a SAN (Storage Area Network) environment.

However, US2002/0103980A presupposes a main frame technology in which the temporal information may be given to the write I/O. However, no temporal information is given to the write I/O in Fibre Channel Protocol used in the SAN environment, so that it is difficult to apply the technology of US2002/0103980A to environments other than the main frame.

US2006/0277384A discloses a technology of indicating the data loss time period that is a time lag in writing data respectively into the storage devices of the primary and remote sites. However, US2006/0277384A discloses no technology of indicating the data recovery available time nor discloses accuracy in monitoring the data loss time period.

In view of the problems described above, the invention seeks to provide a technology that is applicable to technologies other than the main frame technology and that monitors the data recovery available time while suppressing a monitoring error within a certain range in a storage system that performs the Asynchronous Remote Copy among a plurality of storage devices.

SUMMARY OF THE INVENTION

A storage system of the invention includes a first site having a first storage device and a first host computer for reading/writing data from/into the first storage device, a second site having a second storage device and a second host computer for reading/writing data from/into the second storage device and a management computer for managing the first host computer of the first site.

The first storage device performs Asynchronous Remote Copy from the first storage device of the first site to the second storage device of the second site, and the management computer stores latest or quasi-latest management data corresponding to data staying in a buffer of the first storage device of the first site with temporal information at certain monitoring intervals, calculates an estimated value of data recovery available time which is time of data stored in the second storage device of the second site, corresponding to data stored in the first storage device at the time, based on the temporal information stored, and based on a certain management data among earliest or quasi-earliest management data or a number of the data staying in the buffer at a certain time, and displays the estimated value on a display section.

The other means will be described later.

The invention provides a technology that is applicable to technologies other than a main frame technology and that monitors the data recovery available time while suppressing a monitoring error within a certain range in a storage system that performs the Asynchronous Remote Copy among a plurality of storage devices.

BRIEF DESCRIPTION OF DRAWINGS

FIG. 6 is one example of a remote copy definition table created in a memory on a disk controller within the storage device;

FIG. 8 shows one example of a flow-in section I/O table created by a data recovery available time monitoring program on a memory of the management computer;

FIG. 9 is one example of a flow-out section I/O table created by the data recovery available time monitoring program on the memory of the management computer;

BEST MODE FOR CARRYING OUT THE INVENTION

A best mode for carrying out the invention (referred to as an "embodiment" hereinafter) will be explained with reference to the drawings (see appropriately also the drawings not mentioned). An outline of the invention will be explained to facilitate understanding of the invention.

Figure 1:
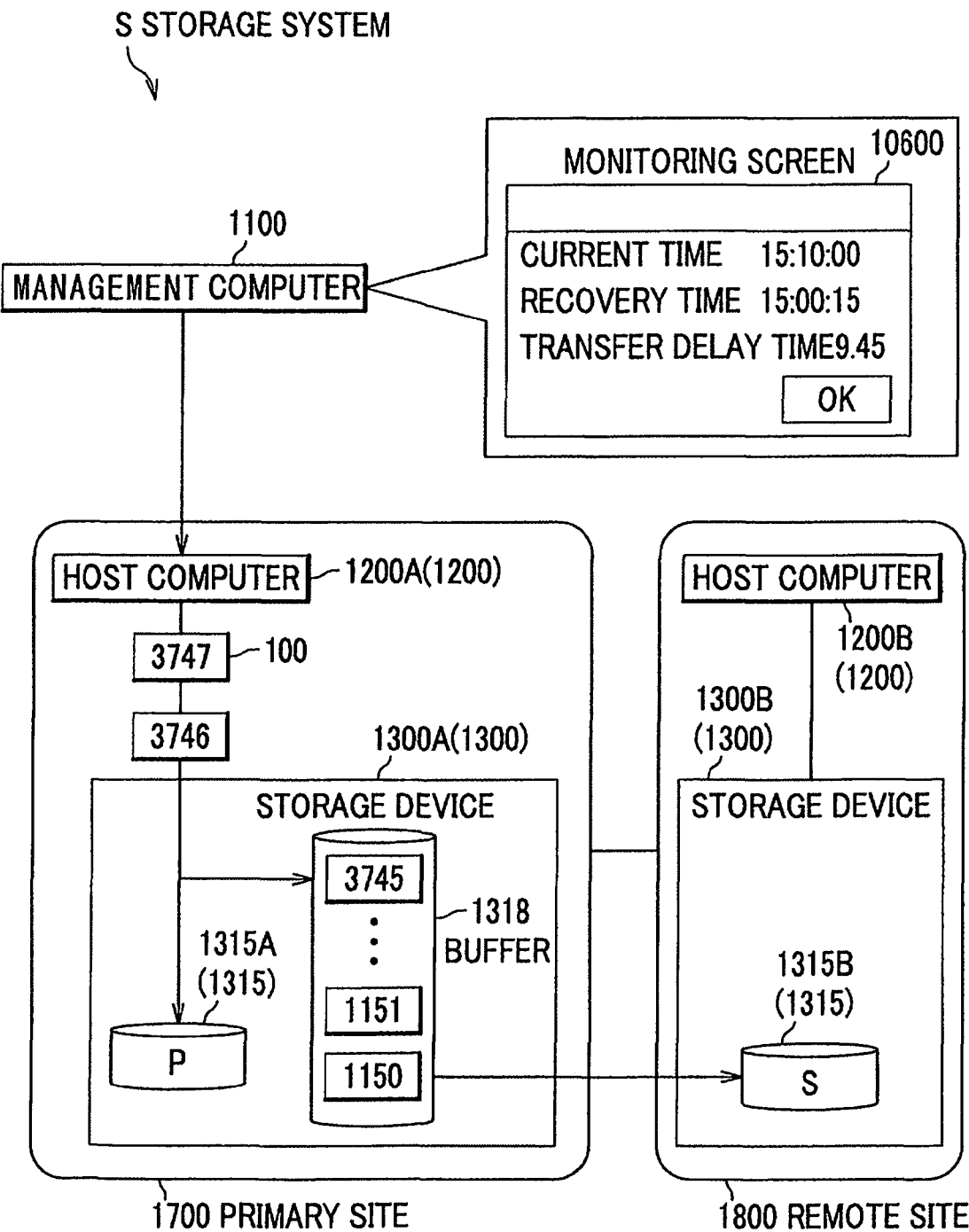
FIG. 1 is a block diagram showing an outline of the invention.

1. Outline of the Invention 1.1 Asynchronous Remote Copy:

The Asynchronous Remote Copy intended by the invention will be explained with reference to FIG. 1. FIG. 1 is a block diagram showing an outline of the invention. A storage system S of the invention includes a management computer 1100, a host computer 1200A coupled with the management computer 1100, a storage device 1300A coupled with the host computer 1200A, a storage device 1300B coupled with the storage device 1300A and a host computer 1200B coupled with the storage device 1300B.

A primary site 1700 (first site) is a site where business operations are carried out. A remote site 1800 (second site) is a site for continuing the business operations when the primary site 1700 is damaged. Each site is provided with the host computer 1200 (generic term of the host computers 1200A and 1200B. The same applies also to other reference numerals) for performing the business operations and with the storage device 1300 for storing business operation data.

The business operations executed on the host computer 1200A provided in the primary site 1700 use a logical disk 1315A on the storage device 1300A. The host computer 1200A issues a write I/O (Write request) in performing the business operations. The write I/O is composed of a write command and write data. The write data issued by an OS (Operating System) or an application and is divided into a transmission unit to be transferred on a network is called as a frame 100 (or referred to simply as a "frame" hereinafter). The frame 100 is a frame of the FCP (Fibre Channel Protocol) in the SAN environment.

Here, the storage device 1300A set up in the primary site 1700 has a buffer 1318. The frame 100 issued from the host computer 1200A is written into the both of the logical disk 1315A and the buffer 1318 on the storage device 1300A of the primary site. The storage device 1300A returns a response that writing is completed to the host computer 1200A at the point of time when write data corresponding to the frame 100 is written into the logical disk 1315A. The write data corresponding to the frame 100 written into the buffer 1318 is transferred to the remote site 1800 (by another process) asynchronously from the writing into the logical disk 1315A. Then, the storage device 1300B of the remote site 1800 writes the received write data into a logical disk 1315B of the device.

Or, the storage device 1300A may store the write data received from the host computer 1200A in a cache memory of the storage device 1300A and may manage the data stored in the cache memory together with the data stored in the buffer 1318 after completing the storage. Then, the storage device 1300A may transfer the write data on the cache memory to the storage device 1300B. At this time, rewriting of the data from the cache memory to a disk device corresponding to the logical disk 1315A may be carried out at time different from the transfer between the aforementioned storage devices.

Note that the logical disk 1315B must keep consistency at a point of time when the host computer 1200B reads in order for the host computer 1200B to resume the business operations by using the logical disk 1315B. Here, the consistency is a concept regarding sequence of data written into the logical disk 1315.

When the host computer writes first data A and next data B into the logical disk 1315 for example, it may be considered that the consistency is kept by arranging so that the host computer writes the data B after receiving a notice that writing of the data A has been completed from the storage device.

A simplest process for keeping this consistency is to write all frames 100 into the logical disk 1315A while keeping the order issued from the host computer 1200A. However, it is possible to write the write data into the logical disk 1315A by any method, as long as the consistency of data in the disk at the moment of accessing the logical disk 1315B is guaranteed, by storing the write data while referring to sequential information given to the frames.

It becomes possible to conform the contents of the data of the logical disks 1315 of the primary and remote sites 1700 and 1800 at most without affecting response of the host computer 1200A by asynchronously conducting the writing into the primary site 1700 and the writing into the remote site 1800. It is also possible to reduce the load on the host computer 1200 because the remote copy process is carried out among the storage devices 1300.

It is noted that the host computer 1200A is not necessary to be one and there may be a plurality of host computers. Because the storage devices 1300 conduct the remote copy, it becomes possible to provide data whose consistency is kept throughout the data used by the plurality of host computers 1200A when the plurality of host computers 1200A realizes a certain process in concert with each other.

There may be a plurality of host computers 1200B in terms of its configuration similarly to the host computers 1200A.

1.2 Data Recovery Available Time:

Next, the data recovery available time monitored by the invention will be explained.

There exists a time lag in writing data into the primary site 1700 and into the remote site 1800 in the Asynchronous Remote Copy as described above. When the primary site 1700 is damaged, the remote site 1800 recovers the data while missing the data of that time lag. Accordingly, it is necessary to monitor a length of the time lag, i.e., to monitor that data of which time can be used for the recovery of the data when the primary site 1700 is damaged. Supposing a case when a failure occurs in the primary site 1700 at certain time, e.g., 21:00:00, the data recovery available time is, as described above, the time when the latest data stored in the storage device 1300B of the remote site 1800 has been written into the storage device 1300A of the primary site 1700, e.g., 20:59:20. That is, the data recovery available time is the latest time by which the data can be recovered.

1.3 Outline of Processing:

A time necessary for transferring the frame 100 from the primary site 1700 to the remote site 1800 is normally in the order of millisecond when the Fibre Channel that is normally used in a large-scale storage system is used for the network among the sites. A time necessary for writing the frame 100 into the logical disk 1315B in the remote site 1800 is also normally in the order of millisecond. Meanwhile, a time during which the frame 100 stays in the buffer 1318 is about five minutes at most. Therefore, the second time scale is sufficient as accuracy in monitoring the data recovery available time. That is, it may be considered that the data recovery available time substantially depends on the time during which the frame 100 stays in the buffer 1318.

Then, the invention monitors the data recovery available time by the following method. In this case, the invention presupposes two points as follows.

The first point is that the host computer 1200A embeds a sequence number into the frame 100 to be issued. This presupposition is realized in general in using the Fibre Channel.

The second point is that the storage device 1300A has a function of acquiring the sequence numbers of the frames 100 existing respectively at inlet and outlet of the buffer 1318. Suppose a case when a frame 100 whose sequence number is "3745" (latest or quasi-latest management) is acquired at the inlet of the buffer 1318 in FIG. 1 and a frame 100 whose sequence number is "1150" (earliest or quasi-earliest data) is acquired at the outlet of the buffer 1318 for example. It is supposed here that FIFO (First In First Out) is adopted for the buffer 1318.

When the two presuppositions described above is true, the management computer 1100 acquires the sequence number of the frame 100 existing at the inlet of the buffer 1318 within the storage device 1300A repeatedly (preferably periodically) through the host computer 1200A. In combination with that, the management computer 1100 acquires TOD (Time of Day: simply referred to as "time" hereinafter) of the host computer 1200A at that moment when it acquires the sequence number and retains their combination as an array.

When it is necessary to acquire the data recovery available time at certain point of time, the management computer 1100 acquires the sequence number of the frame 100 existing at the outlet of the buffer 1318 within the storage device 1300A through the host computer 1200A. The time when the frame 100 having this sequence number has existed at the inlet of the buffer 1318 is the data recovery available time. This time may be acquired approximately by using the array described above (this will be detailed later).

Thus, it becomes possible to monitor the data recovery available time by the time managed by the host computer 1200A. It is also possible to display its result in a GUI (Graphical User Interface) like a monitoring screen 10600 shown in FIG. 11.

Figure 2:
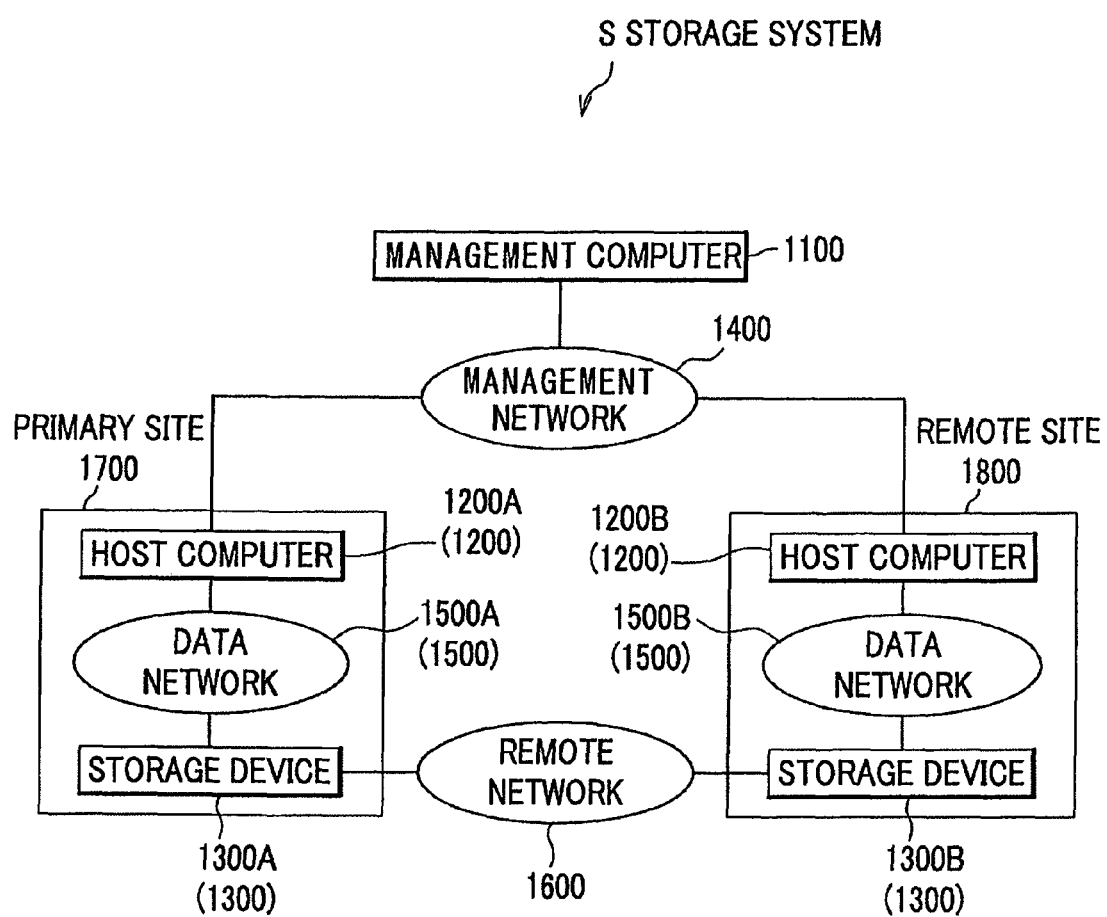
FIG. 2 is a block diagram showing a configuration of a storage system of an embodiment.

2. Configuration of Storage System 2.1 Outline of Configuration:

A configuration of the storage system S will be explained with reference to FIGS. 2 through 5. FIG. 2 is a block diagram showing the configuration of a storage system of an embodiment. The storage system S includes the management computer 1100, the host computer 1200A and the storage device 1300A in the primary site 1700 and the host computer 1200B and the storage device 1300B in the remote site 1800.

In the storage system S, the storage device 1300 (1300A and 1300B) and the host computer 1200 (1200A and 1200B) are coupled from each other through the data network 1500 (1500A and 1500B). It is noted that although the data network 1500 is the SAN in the present embodiment, it may be IP (Internet Protocol) network or a data communication network other than those networks.

The host computer 1200 is coupled with the management computer 1100 through a management network 1400. While the management network 1400 is the IP network in the present embodiment, it may be the SAN or the data communication network other than those networks. Still more, although the management computer 1100 is not coupled directly with the storage device 1300 and acquires information through the host computer 1200, the invention may be carried out even by arranging such that the management computer 1100 is directly coupled with the storage device 1300. Still more, although the data network 1500 is different from the management network 1400 in the present embodiment, those networks may be one and same network. Further, the management computer 1100 may be also one and same computer with the host computer 1200.

It is noted that although the storage system S is composed of the two storage devices 1300, the two host computers 1200 and one management computer 1100 as shown in FIG. 2 for convenience of explanation, the invention is limited to those numbers. Still more, although the management computer 1100 is coupled with the host computers 1200A and 1200B, the invention may be carried out by coupling the management computer 1100 only with the host computer 1200A of the primary site 1700. The reason why the management computer 1100 is coupled also with the host computer 1200B in the present embodiment is that the roles of the primary and remote sites 1700 and 1800 are possibly swapped. Specifically, when the primary site 1700 is damaged, a swapping command is issued to change a data transferring direction from the remote site 1800 to the primary site 1700 as described later.

A set of the host computer 1200, the storage device 1300 and the data network 1500 coupling them will be called as a site in the present embodiment. A plurality of such sites is placed at positions geographically distant from each other in general, so that the other site can continue business operations even if one site is damaged. FIG. 2 shows an architecture including the primary site 1700 that performs business operations and the remote site 1800 that backs up the business operations. Such architecture will be called as a two data center architecture (referred to as "2DC" hereinafter).

In the 2DC architecture, Remote Copy is carried out between the primary site 1700 and the remote site 1800 through a remote network 1600. The Remote Copy technology allows system operations to be continued by using data stored in a volume of another site even if one site causes a failure in its volume and becomes inoperable. A pair of the two volumes of a copy source and a copy destination involved in the Remote Copy will be called as a copy pair.

Configurations of the management computer 1100, the host computer 1200 and the storage device 1300 will be explained below.

Figure 3:
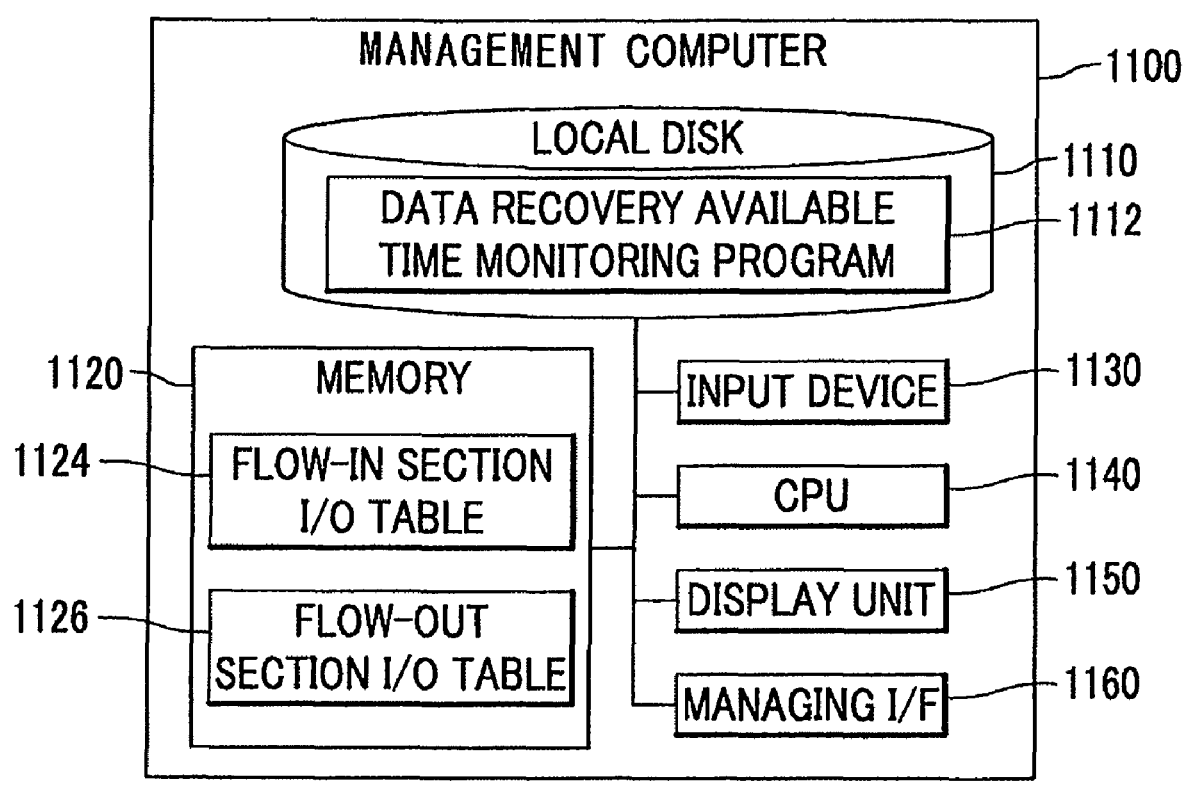
FIG. 3 is a block diagram showing a configuration of a management computer.

2.2 Configuration of Management Computer:

FIG. 3 is a block diagram showing the configuration of the management computer 1100. The management computer 1100 has an input device 1130 such as a keyboard and a mouse, a CPU (Central Processing Unit) 1140, a display unit (display section) 1150 such as a CRT (Cathode Ray Tube), a memory 1120, a local disk 1110 and a supervisory I/F (Interface) 1160 for transmitting/receiving data and control commands to/from the host computer 1200 to manage the system.

The local disk 1110 is a disk device such as a hard disk coupled with (or mounted within) the management computer 1100 and stores a data recovery available time monitoring program 1112.

The data recovery available time monitoring program 1112 is loaded into the memory 1120 of the management computer 1100 and is executed by the CPU 1140. The data recovery available time monitoring program 1112 is a program for providing the function of monitoring the data recovery available time of the Asynchronous Remote Copy through the input device 1130 such as the keyboard and the mouse and the display unit 1150 such as the GUI (Graphical User Interface).

A flow-in section I/O table 1124 and a flow-out section I/O table 1126 on the memory 1120 will be described later.

The management I/F 1160 is an interface for the management network 1400 and transmits/receives data and control commands to/from the host computer 1200.

Figure 4:
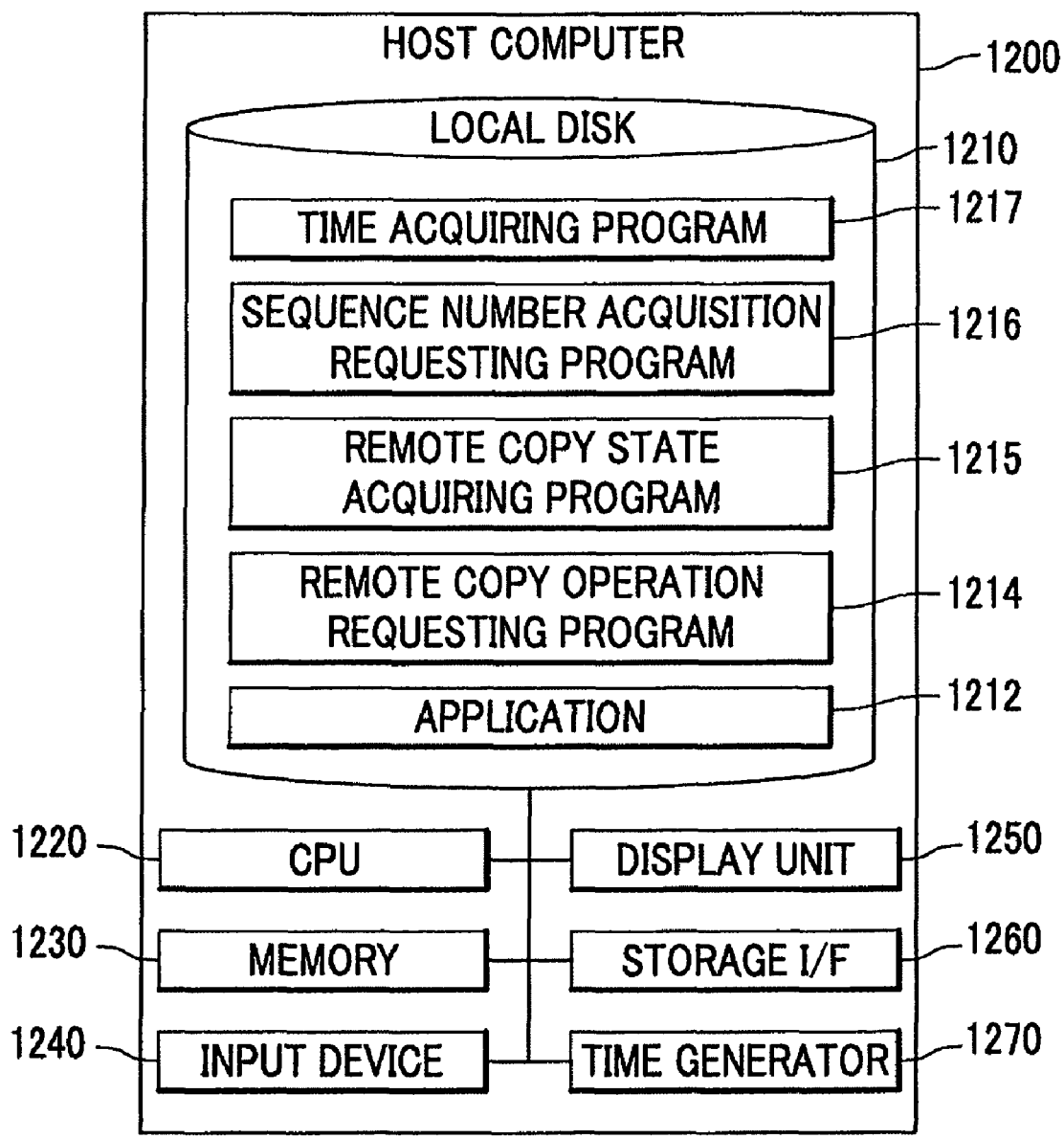
FIG. 4 is a block diagram showing a configuration of a host computer.

2.3 Configuration of Host Computer:

FIG. 4 is a block diagram showing the configuration of the host computer 1200. The host computer 1200 has an input device 1240 such as a keyboard and a mouse, a CPU 1220, a display unit 1250 such as a CRT, a memory 1230, a storage I/F 1260, a local disk 1210 and a time generator 1270.

The storage I/F 1260 is an interface for the data network 1500 and transmits/receives data and control commands to/from the storage device 1300. The local disk 1210 is a disk device such as a hard disk coupled with (or mounted within) the host computer 1200 and stores an application 1212, a remote copy operation requesting program 1214, a remote copy state acquiring program 1215, a sequence number acquisition requesting program 1216 and a time acquiring program 1217.

The application 1212 is loaded into the memory 1230 of the host computer 1200 and is executed by the CPU 1220. The application 1212 is a program that executes processes by reading/writing data from/into volumes on the storage device 1300 and is a DBMS (Data Base Management System), a file system and the like. It is noted that although FIG. 4 shows only one application 1212 for convenience of explanation, the invention is not limited to this number.

The time acquiring program 1217 is a program for acquiring time managed by the host to return to a request source based on an instruction from the user or another program.

The remote copy operation requesting program 1214, the remote copy state acquiring program 1215, the sequence number acquisition requesting program 1216 and the time acquiring program 1217 are loaded into the memory 1230 of the host computer 1200 and are executed by the CPU 1220.

The remote copy operation requesting program 1214 is a program for requesting an operation of Remote Copy on the storage device 1300 specified based on an instruction from the user or the other program. Description will be made later as to what kinds of operation can be requested.

The remote copy state acquiring program 1215 is a program for acquiring a state of the Remote Copy from the storage device 1300 to return to a request source based on an instruction from the user or the other program. Description will be made later as to what kinds of state can be obtained.

The sequence number acquisition requesting program 1216 invokes the sequence number acquiring program 1340 (see FIG. 5) on the storage device 1300 based on an instruction from the user or the other program. The sequence number acquisition requesting program 1216 also invokes the time acquiring program 1217 to acquire the current time. The sequence number acquisition requesting program 1216 returns a value returned from the sequence number acquiring program 1340 on the storage device 1300 and the current time acquired from the time acquiring program 1217 to the invoker.

Figure 5:
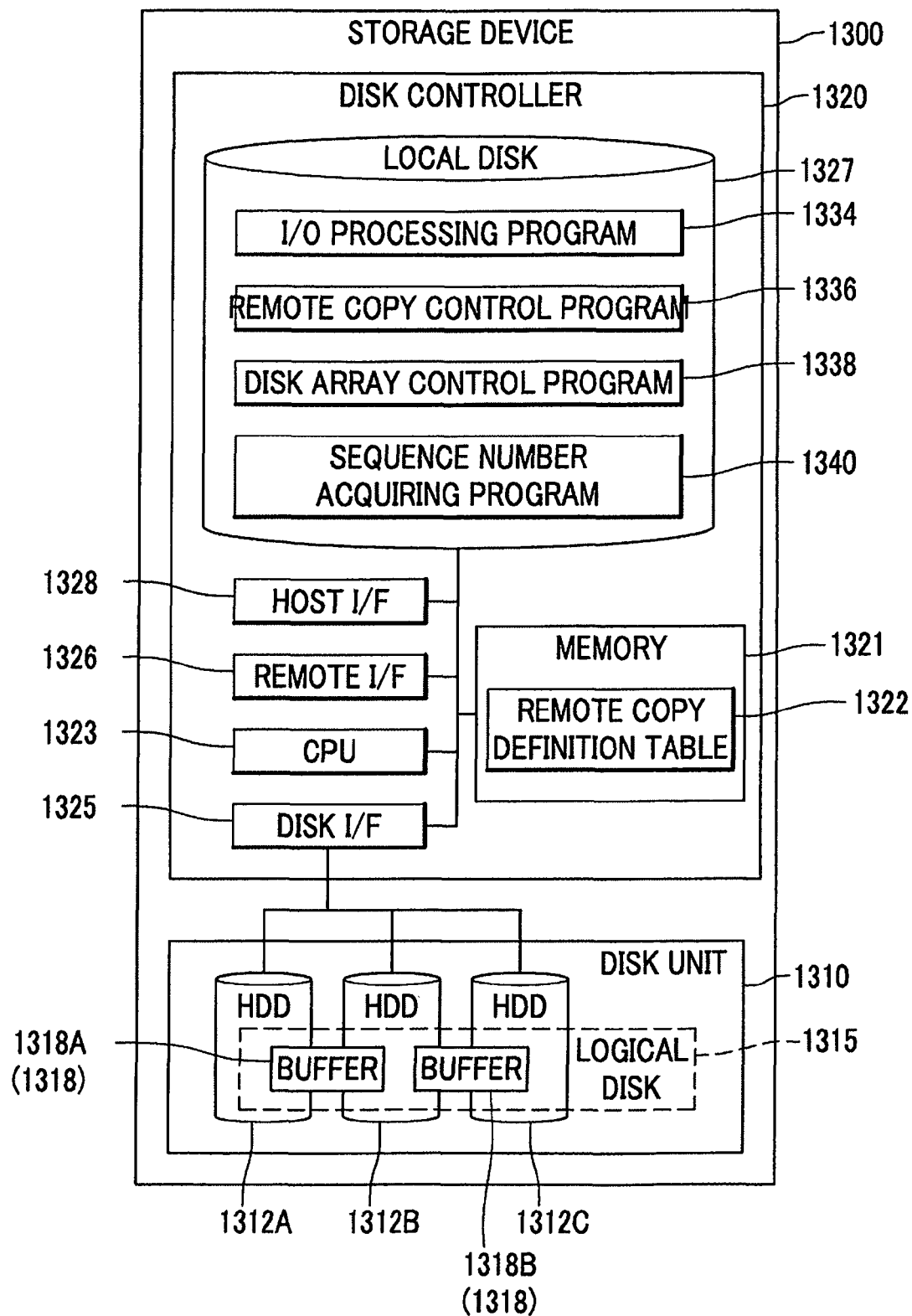
FIG. 5 is a block diagram showing a configuration of a storage device.

2.4 Configuration of Storage Device:

FIG. 5 is a block diagram showing the configuration of the storage device 1300. The storage device 1300 has the disk device 1310 for storing data and a disk controller 1320 for controlling the storage device 1300.

The disk controller 1320 is provided with a host I/F 1328, a remote I/F 1326, a disk I/F 1325, a memory 1321, a CPU 1323 and a local disk 1327.

The host I/F 1328 is an interface for the data network 1500 and transmits/receives data and control commands to/from the host computer 1200.

The remote I/F 1326 is an interface for the remote network 1600 and is used in transferring Remote Copy data across the sites.

The disk I/F 1325 is an interface for the disk device 1310 and transmits/receives the data and control commands.

A remote copy definition table 1322 on the memory 1321 will be explained later.

The local disk 1327 is a disk device such as a hard disk coupled with the disk controller 1320 and stores an I/O processing program 1334, a remote copy control program 1336, a disk array control program 1338 and a sequence number acquiring program 1340.

The I/O processing program 1334 is loaded into the memory 1321 of the disk controller 1320 and is executed by the CPU 1323. The I/O processing program 1334 accepts write and read requests from the host computer 1200 and another storage device 1300. If the request is a write request, the I/O processing program 1334 writes data to the disk device 1310 and if the request is a read request, the I/O processing program 1334 reads requested data out of the disk device 1310.

The remote copy control program 1336 is loaded into the memory 1321 of the disk controller 1320 and is executed by the CPU 1323.

The remote copy control program 1336 controls Remote Copy and acquires a state of Remote Copy by making reference to the remote copy definition table 1322 based on an instruction from the user, the host computer 1200 or the other program. As to controls of the copy pair, there are such operations as creation of copy pair for newly creating a copy pair, suspension of copy pair for interrupting a synchronous relationship, resynchronization of copy pair for conforming contents of a remote side volume with that of a primary side volume and others. The acquisition of the state of the copy pair means to grasp that each copy pair is put in which state by which operation. The transition of states of the copy pair will be described later.

The disk array control program 1338 is loaded into the memory 1321 of the disk controller 1320 and is executed by the CPU 1323. The disk array control program 1338 has a function of reconstructing a plurality of hard disk drives 1312A, 1312B and 1312C coupled with the disk controller 1320 as the logical disk 1315 for example by controlling them. A disk array control method may be one such as RAID (Redundant Array of Independent Disks), the invention is not limited to such method.

The sequence number acquiring program 1340 is loaded into the memory 1321 of the disk controller 1320 and is executed by the CPU 1323. The sequence number acquiring program 1340 is a program that acquires the sequence numbers of the frames 100 staying at the inlet and the outlet among the frames 100 staying in the buffer 1318 of the storage device 1300 and returns the sequence numbers to a request source based on an instruction from the user, the host computer 1200 or the other program. The sequence number is an ID given to the frame 100. For instance, when the frame 100 is issued from the host computer, the sequence number is given to the individual frame 100 in the storage system using the Fibre Channel Protocol.

It is noted that although the programs 1334, 1336, 1338 and 1340 are stored in the local disk 1327 on the disk controller 1320 in the present embodiment, the invention is not limited to such configuration. For instance, it is also possible to provide a flash memory or the like on the disk controller 1320 and to store those programs 1334, 1336, 1338 and 1340 in the flash memory or to store in an arbitrary disk within the disk device 1310.

The disk device 1310 is composed of the plurality of hard disk drives (HDD) 1312A, 1312B and 1312C. It is noted that the disk device may be composed of other drives such as a solid state drive (SSD) other than the hard disk drive. It is also noted that FIG. 5 shows only three volumes for convenience of explanation, the invention is not limited such number. Note that the logical disk 1315 is constructed within the disk device 1310 as described above.

The buffer 1318 (1318A and 1318B) is constructed in the logical disk 1315 within the disk device 1310. During Asynchronous Remote Copy, writing into the disk device 1310 within the storage device 1300B of the remote site 1800 is carried out asynchronously from writing into the disk device 1310 within the storage device 1300A of the primary site 1700. The buffer 1318 is used in order to temporarily store data to asynchronously write into the disk device 1310 within the storage device 1300B of the remote site 1800.

It is noted that although not shown in FIG. 5, the storage devices 1300A and 1300B have cache memories for temporarily storing a part or whole of write data from each host computer 1200 and a part or whole of read data transferred to each host computer 1200 due to a read request in the past. The storage device 1300 transfers the data stored in the cache memory corresponding to the read request from the host computer 1200 (i.e., the part or whole of past write data and the part or whole of past read data) to the host computer 1200. It is noted that the memory 1321 may assume the role of the cache memory.

It is noted that the buffer 1318 may straddle the plurality of logical disks 1315. Still more, the buffer 1318 needs not be always provided within the disk device 1310. The buffer 1318 may be provided on the local disk 1327 and the memory 1321 of the disk controller 1320 or in the cache memory. It is also possible to use those memory areas together. In the case of the cache memory in particular, an area used as a buffer of the Asynchronous Remote Copy needs not be physically partitioned or needs not be continuous addresses. It is just required to store data to be copied as Remote Copy.

Still more, although FIG. 5 shows the two buffers 1318 for convenience of explanation, the invention is not limited to that number.

3. Asynchronous Remote Copy

A concrete example of the Asynchronous Remote Copy that is an object of the present invention will be explained with reference to FIGS. 6 and 7.

3.1 Remote Copy Definition Table:

FIG. 6 is one exemplary table of a remote copy definition table 1322 created in the memory 1321 on the disk controller 1320 within the storage device 1300.

The remote copy definition table 1322 is roughly divided into a Primary Site field 6100 and a Remote Site field 6200. Each field stores information of the logical disk 1315 of the primary site 1700 and of the logical disk 1315 of the remote site 1800 composing the copy pair.

The Primary Site field 6100 and the Remote Site field 6200 include Storage Device fields 6110 (6110A and 6110B) and Logical Disk Number fields 6120 (6120A and 6120B), respectively. The Storage Device filed 6110 stores an ID of the storage device 1300 in which the logical disk 1315 is stored. The storage device 1300 may be identified uniquely by the ID. The ID includes an IP address for example. The Logical Disk Number field 6120 stores a number of the logical disk 1315. This number is unique within the storage device 1300.

Rows 6010 through 6050 indicate information of copy pairs. For example, the row 6010 indicates that the logical disk 1315 "LDEV01" stored in the storage device 1300A of the primary site 1700 composes a copy pair with the logical disk 1315 "LDEV01" stored in the storage device 1300B of the remote site 1800. Therefore, the remote copy definition table 1322 shows that the five logical disks 1315 stored in the storage device 1300A of the primary site 1700 compose five copy pairs with the five logical disks 1315 stored in the storage device 1300B of the remote site 1800. These five copy pairs are handled as a group that is called as a copy group.

It is noted that although the present embodiment exemplifies the structure in which there is only one each storage device 1300 in the primary site 1700 and the remote site 1800, there may be two or more storage devices in each site. In this case, the remote copy definition table 1322 may be defined across the plurality of storage devices 1300B of the primary site 1700 or the remote copy definition table 1322 may be defined across the plurality of storage devices 1300B of the remote site 1800. Further, although the storage device 1300 has one remote copy definition table 1322 in the present embodiment, the storage device 1300 may have a plurality of remote copy definition tables 1322. That is, it is possible to have a plurality of copy groups.

Figure 7:
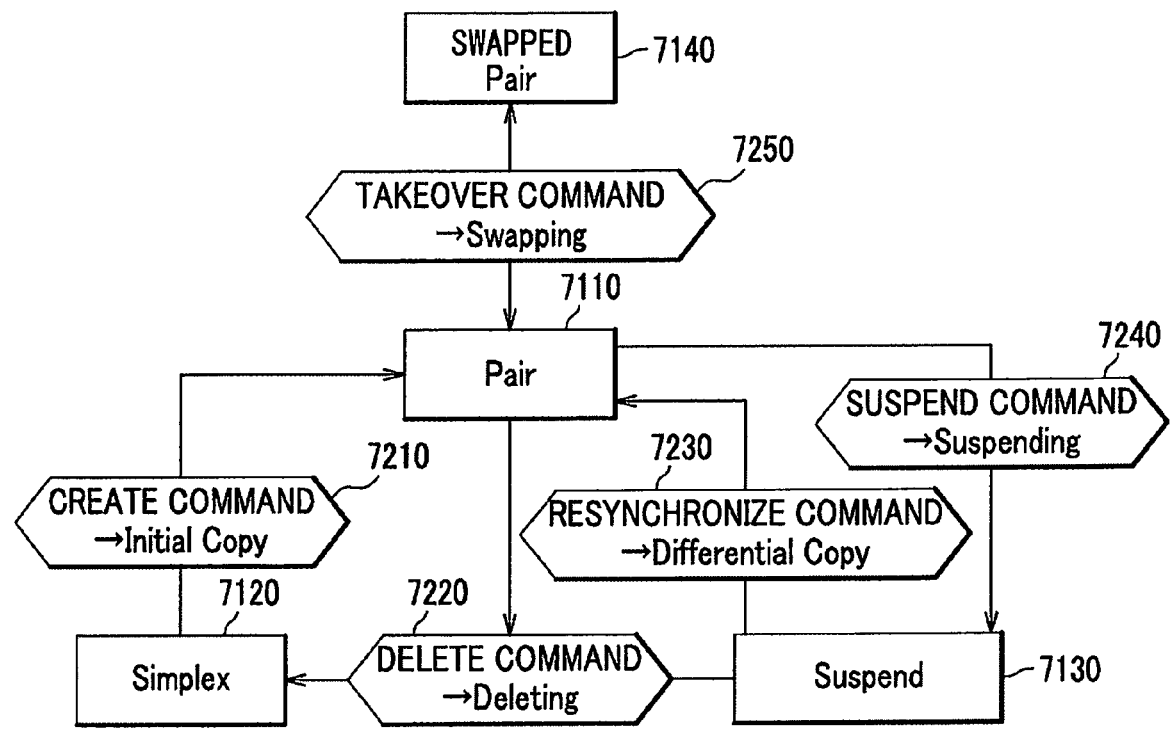
FIG. 7 is a state transition diagram of a copy pair of Asynchronous Remote Copy.
Figure 7:
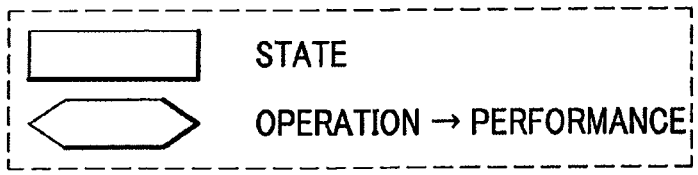

3.2 State Transition of Copy Pair:

FIG. 7 is a state transition diagram of a copy pair of the Asynchronous Remote Copy.

As described in a legend shown in a lower part of FIG. 7, rectangles indicate states of the copy pair and hexagons indicate operations instructed from the user or programs and behaviors of the copy pair caused by the operations.

The copy pair of the Asynchronous Remote Copy has four states.

Pair 7110 is a state in which the Asynchronous Remote Copy is conducted between the logical disk 1315 of the primary site 1700 and the logical disk 1315 of the remote site 1800. That is, the frame 100 written into the logical disk 1315 of the primary site 1700 is written asynchronously (by another process) into the logical disk 1315 of the remote site 1800.

Simplex 7120 indicates a state in which there is no relationship of copy pair between the logical disk 1315 of the primary site 1700 and the logical disk 1315 of the remote site 1800. That is, the frame 100 written into the logical disk 1315 of the primary site 1700 is not written into the remote site 1800.

Suspend 7130 is a state in which the Asynchronous Remote Copy between the logical disk 1315 of the primary site 1700 and the logical disk 1315 of the remote site 1800 is temporarily interrupted. That is, the frame 100 written into the logical disk 1315 of the primary site 1700 is not written into the remote site 1800 and is kept as differential information.

Swapped Pair 7140 is a state in which the Asynchronous Remote Copy is conducted in a state in which the role of the logical disk 1315 of the primary site 1700 is switched with that of the logical disk 1315 of the remote site 1800. That is, the frame 100 written into the logical disk 1315 of the remote site 1800 is written asynchronously (by another process) into the logical disk 1315 of the primary site 1700.

It is noted that the data recovery available time may be acquired only in the states of Pair 7110 and Swapped Pair 7140. That is, no Asynchronous Remote Copy is conducted from the primary site 1700 to the remote site 1800 in the states of Simplex 7120 and Suspend 7130, so that there is no meaning of monitoring the data recovery available time.

Next, the operations instructed from the user or the programs and the transition of the states of the copy pair caused by the operations will be explained.

Initial Copy starts when a Create command of forming a copy pair is issued in the state of Simplex 7120 (7210). The Initial Copy is to copy all data of the logical disk 1315 of the primary site 1700 to the logical disk 1315 of the remote site 1800 before starting the Asynchronous Remote Copy. When the Initial Copy ends, the contents of the logical disk 1315 of the primary site 1700 coincide with that of the logical disk 1315 of the remote site 1800, thus forming the Pair 7110. Still more, the buffer 1318 is allotted at this time. It is noted that the buffer 1318 is allotted in unit of the copy group.

Suspending starts when a Suspend command is issued in the state of the Pair 7110 (7240). Suspending is a performance for temporarily interrupting the Asynchronous Remote Copy. Specifically, it is to prepare a differential management table for managing that writing has been made to which address within the logical disk 1315 during the Suspend 7130 in the memory 1321 within the disk controller 1320. This differential management table manages addresses within the disk device 1310 that are changed by the frame 100. It is noted that the differential management table may be created in the disk device 1310.

Differential Copy starts when a Resynchronize command is issued in the state of the Suspend 7130 (7230). The Differential Copy is to transfer the difference generated during the Suspend 7130 from the logical disk 1315 of the primary site 1700 to the logical disk 1315 of the remote site 1800 based on the differential management table. When the transfer ends, the contents of the logical disk 1315 of the primary site 1700 is synchronized with that of the logical disk 1315 of the remote site 1800, thus forming the Pair 7110.

Swapping starts when a Takeover command is issued in the state of the Pair 7110 or the Swapped Pair 7140. Swapping is a behavior of reversing the data transferring direction between the sites. When the Takeover command is issued in the state of the Pair 7110, the data transferring direction is changed in a direction from the remote site 1800 to the primary site 1700. This operation is used when a failure occurs in the primary site 1700 for example. This operation allows the site conducting the business operations to be switched from the primary site 1700 to the remote site 1800.

Deleting starts when a Delete command is issued in the state of the Pair 7110 or the Suspend 7130 (7220). Deleting is to cancel the relationship of the Asynchronous Remote Copy. When Deleting ends, the state changes to that of the Simplex 7120 and the frame 100 written into the logical disk 1315 of the primary site 1700 is not transferred to the remote site 1800. It is noted that the buffer 1318 allotted during the Initial Copy is released at this time.

3.3 Processing of Remote Copy in Pair:

The Asynchronous Remote Copy of the present embodiment realizes duplication of data of the logical disk 1315 by the following process. It is noted that the Asynchronous Remote Copy may be realized by a method other than this method.

When the host computer 1200A transmits the frame 100 to the storage device 1300A of the primary site 1700, the host computer 1200A gives the sequence number to the frame 100.

The storage device 1300A of the primary site 1700 received the frame 100 from the host computer 1200A stores the received frame 100 in the memory. The storage device 1300A also stores the received frame 100 in the memory 1321 and the logical disk 1315A within the device 1300A and transmits a response indicating that receiving of the frame 100 has been completed to the host computer 1200A.

Meanwhile, the storage device 1300A of the primary site 1700 transmits the frame 100 stored in the memory 1321 or the logical disk 1315 to the storage device 1300B of the remote site 1800 together with its given sequence number.

The storage device 1300B of the remote site 1800 that received the frame 100 writes the frame 100 into the logical disk 1315 by making reference to the sequence number given to that frame 100. Thereby, even if the data in the logical disk 1315 of the storage device 1300A of the primary site 1700 is lost, it becomes possible to assure the consistency of the data stored in the logical disk 1315 of the storage device 1300B of the remote site 1800.

4. Management Computer:

Tables and processes managed by the management computer 1100 of the present embodiment will be explained with reference to FIGS. 8 through 14.

4.1 Table:

FIG. 8 is one example of the flow-in section I/O table 1124 created by the data recovery available time monitoring program 1112 on the memory 1120 of the management computer

1100. The flow-in section I/O table 1124 includes a Time field 8100 and a Sequence Number field 8200. The flow-in section I/O table 1124 may have a plurality of rows (8010 through 8050 for example).

The Time field 8100 stores current time that is one of return values of the sequence number acquisition requesting program 1216. The Sequence Number field 8200 stores the sequence number of the frame 100 staying at the inlet among the frames 100 staying in the buffer 1318 of the storage device 1300. The sequence number is also one of the return values of the sequence number acquisition requesting program 1216.

FIG. 9 is one example of the flow-out section I/O table 1126 created by the data recovery available time monitoring program 1112 on the memory 1120 of the management computer 1100.

The flow-out section I/O table 1126 includes a Time field 9100 and a Sequence Number field 9200. The flow-out section I/O table 1126 is composed of a single raw (9010).

The Time field 9100 stores current time that is one of return values of the sequence number acquisition requesting program 1216. The Sequence Number field 9200 stores the sequence number of the frame 100 staying at the outlet among the frames 100 staying in the buffer 1318 of the storage device 1300. The sequence number is also one of the return values of the sequence number acquisition requesting program 1216.

4.2 GUI:

The GUI arranged so that the management computer 1100 urges the user to set a data recovery available time monitoring interval and displays its result will be explained with reference to FIGS. 10 and 11.

Figure 10:
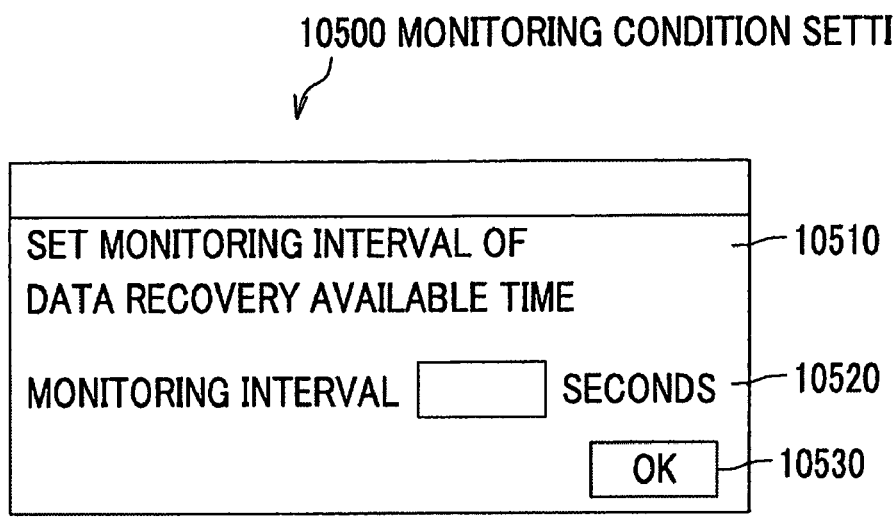
FIG. 10 shows a monitoring condition setting screen displayed on a display unit by the management computer to urge a user to set a monitoring interval of the data recovery available time.

FIG. 10 shows a monitoring condition setting screen 10500 displayed on the display unit 1150 by the management computer 1100 to urge the user to set the monitoring interval of the data recovery available time. The monitoring condition setting screen 10500 includes a message portion 10510, a monitoring interval input portion 10520 and a button 10530.

The message portion 10510 indicates a message urging the user to input the monitoring interval.

The monitoring interval input portion 10520 indicates a text box for accepting an input of the monitoring interval from the user.

The button 10530 is a control section clicked by the user after inputting the monitoring interval. Thereby, the data recovery available time monitoring program 1112 keeps the monitoring interval inputted by the user to the monitoring interval input portion 10520.

Figure 11:
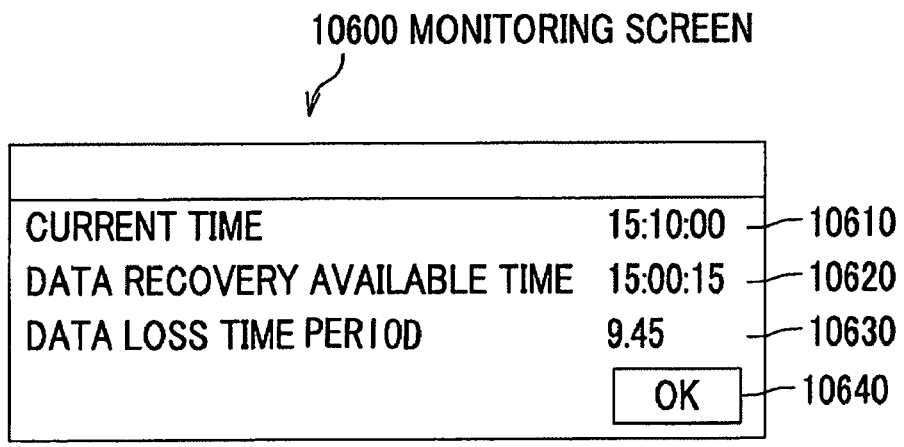
FIG. 11 shows a monitoring screen of the data recovery available time displayed by the management computer on the display unit.

FIG. 11 shows a monitoring screen 10600 of the data recovery available time displayed by the management computer 1100 on the display unit 1150. The monitoring screen 10600 includes Current Time 10610, the Data Recovery Available Time 10620, Data loss time period 10630 and a button 10640.

The Current Time 10610 indicates time returned by the data recovery available time monitoring program 1112.

The Data Recovery Available Time 10620 indicates the data recovery available time calculated by the data recovery available time monitoring program 1112.

The Data Loss Time Period 10630 indicates the data loss time period calculated by the data recovery available time monitoring program 1112. The button 10640 closes the monitoring screen 10600 when clicked.

It is noted that although the monitoring condition setting screen 10500 and the monitoring screen 10600 are displayed on the display unit 1150 of the management computer 1100 in the present embodiment, these GUI may be displayed on a display of another computer by using a generally known technology such as a Web server.

Figure 12:
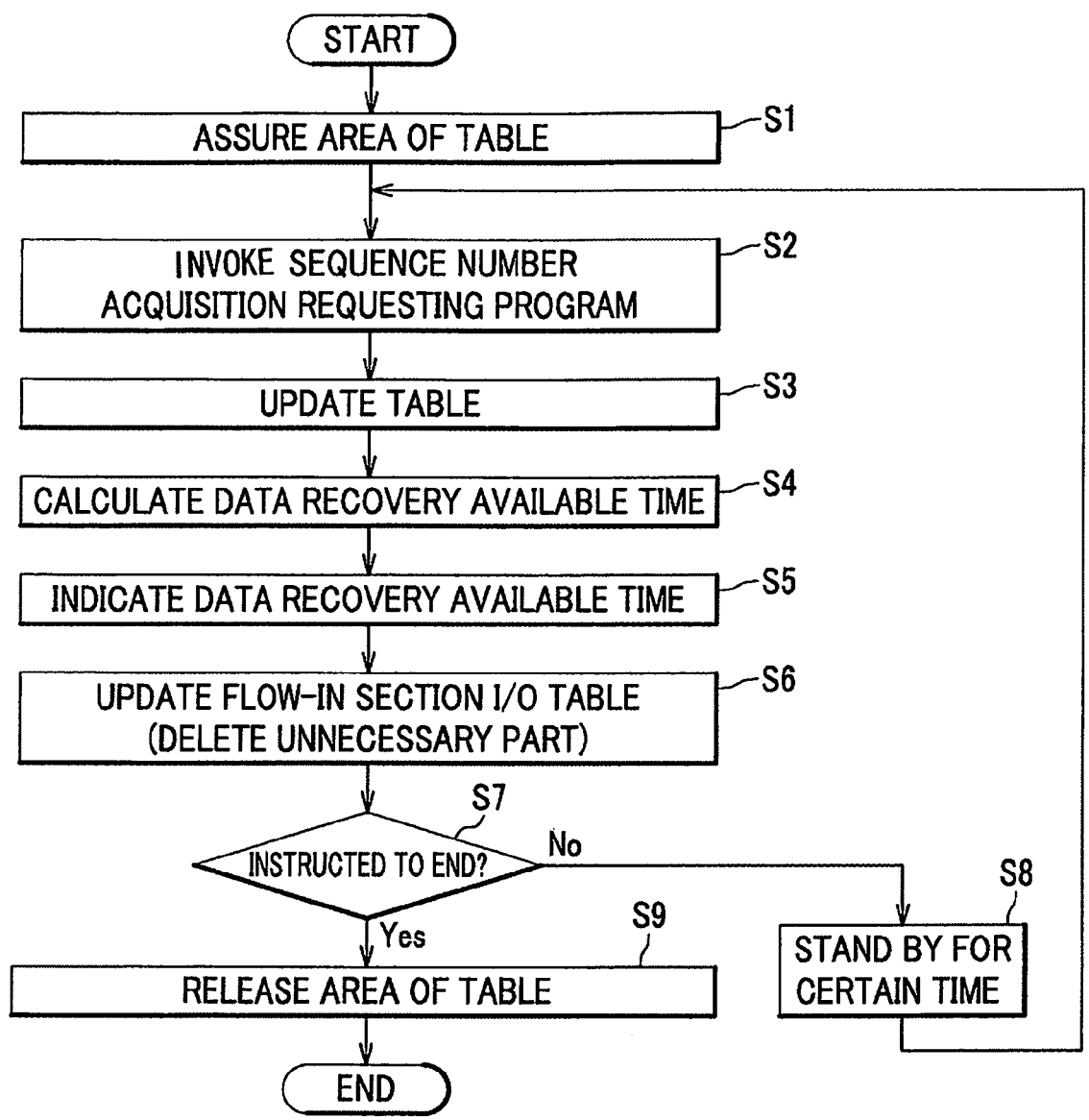
FIG. 12 is a flowchart showing a processing procedure of the data recovery available time monitoring program.

4.3 Flowchart:

A processing procedure of the data recovery available time monitoring program 1112 executed by the management computer 1100 to acquire and display the data recovery available time will be explained by using a flowchart shown in FIG. 12. FIG. 12 is a flowchart showing the processing procedure of the data recovery available time monitoring program 1112.

The CPU 1140 of the management computer 1100 (the subject of the operation will be denoted as the "management computer 1100" hereinafter) starts the processes of the data recovery available time monitoring program 1112 by receiving an instruction from the user or the other program.

The management computer 1100 assures an area for the flow-in section I/O table 1124 and the flow-out section I/O table 1126 on the memory 1120 as an initialization process in Step S1.

Next, the management computer 1100 invokes the sequence number acquisition requesting program 1216 on the host computer 1200A in Step S2. As a result, the management computer 1100 receives three information of the sequence number of the frame 100 staying at the inlet of the buffer 1318 among the frames 100 staying in the buffer 1318 of the storage device 1300A, the sequence number of the frame 100 staying at the outlet of the buffer 1318 and the current time as return values.

Next, the management computer 1100 updates the flow-in section I/O table 1124 and the flow-out section I/O table 1126 in Step S3. Specifically, the management computer 1100 adds the current time and the sequence number of the frame 100 staying at the inlet of the buffer 1318 among the frames 100 staying in the buffer 1318 of the storage device 1300A to the last row of the flow-in section I/O table 1124. The management computer 1100 also updates the flow-out section I/O table 1126 by the current time and the sequence number of the frame 100 staying at the outlet of the buffer 1318 among the frames 100 staying in the buffer 1318 of the storage device 1300A.

Next, the management computer 1100 calculates the data recovery available time by utilizing the flow-in section I/O table 1124 and the flow-out section I/O table 1126 in Step S4.

The data recovery available time may be calculated by measuring a time during which the frame 100 stays in the buffer 1318 as described above.

Figure 13:
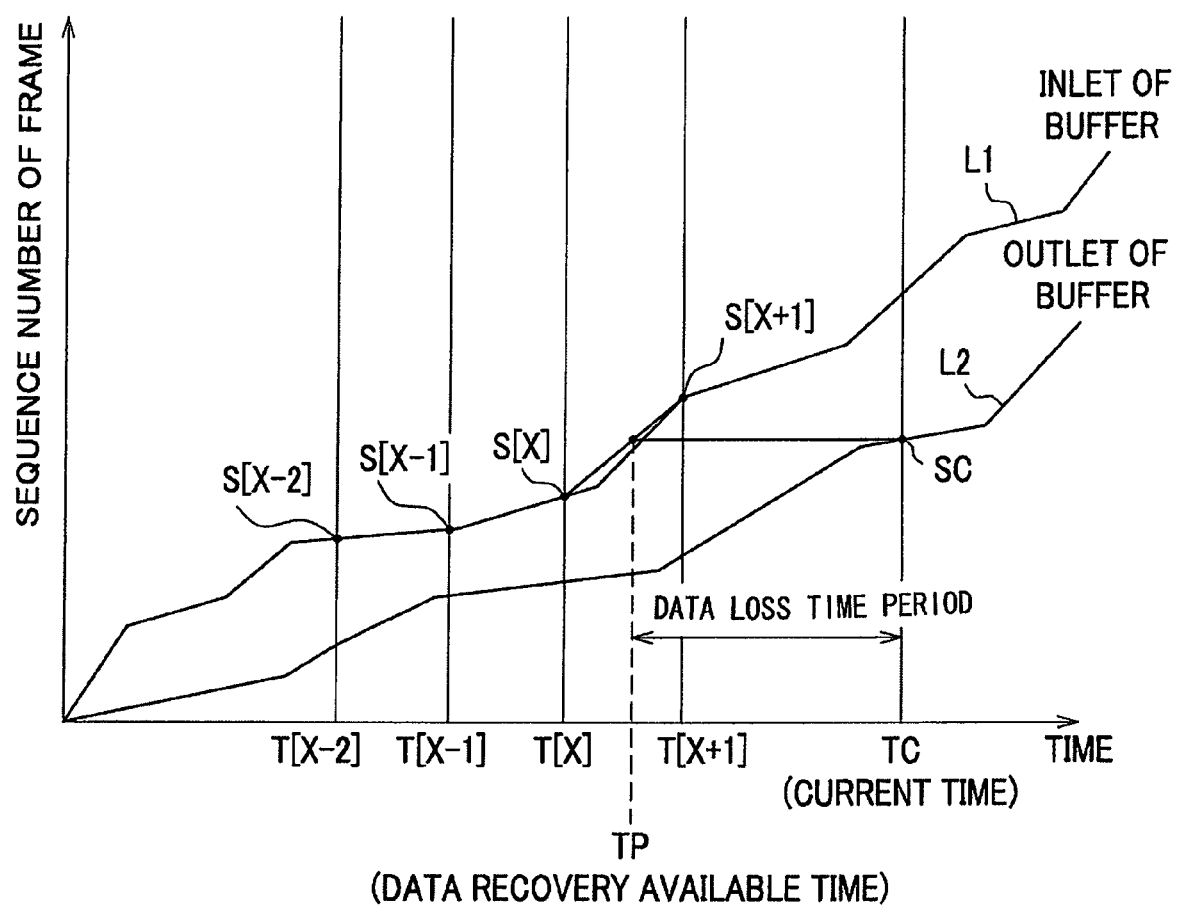
FIG. 13 is a graph for explaining calculations of the data recovery available time.

This calculation will be concretely explained below by making reference to FIG. 13. FIG. 13 is a graph explaining the calculation of the data recovery available time. In the graph in FIG. 13, an axis of abscissas represents time and an axis of ordinate represents sequence numbers of the frames. L1 is a line representing the sequence numbers of the frames at the inlet of the buffer 1318 and L2 is a line representing the sequence numbers of the frames at the outlet of the buffer 1318. It is noted that although the lines L1 and L2 are continuous in the figure, they actually assume discrete values.

The explanation will be continued by making reference to the drawings other than FIG. 13. The flow-out section I/O table 1126 stores the sequence number and acquisition time of the latest frame acquired at the outlet of the buffer 1318. Suppose here that the current time (this may be certain time other than the current time) is TC and the sequence number acquired from the outlet of the buffer 1318 at this time is SC. Suppose also an estimated value of time when the frame having the sequence number SC has arrived at the inlet of the buffer 1318 as TP. That is, the data recovery available time at the time TC is TP. At this time, TC-TP is a data loss time period.

Here, the flow-in section I/O table 1124 has a plurality of rows. When a number of these rows is denoted by M, time of the respective rows are denoted by T[1], T[2], ... and T[M] and the sequence numbers of respective rows are denoted by S[1], S[2], ... and S[M].

At this time, there exist S[X] and S[X+1] that meet S[X] ☐SC<S[X+1] in the flow-in section I/O table 1124.

Therefore, a range of TP may be narrowed down to T[X] ☐TP<T[X+1]

As a result, TP may be obtained approximately by linear interpolation by using the following equation (1) for example:

$$TP=T[X]+(T[X+1]-T[X])\times(SC-S[X])\div(S[X+1]-S[X]) \qquad \text{Eq. 1}$$

It is noted that although the linear interpolation is used in the present embodiment, generally known other approximation methods such as polynomial interpolation and spline interpolation may be also used.

The explanation will be continued by returning to FIG. 12. Next, the management computer 1100 displays the current time, data recovery available time and data loss time period found in Step S4 on the monitoring screen 10600 in Step S5.

Due to the process in Step S4, the rows less than X are not referred in the next time and after that (become unnecessary) in the flow-in section I/O table 1124. Accordingly, the management computer 1100 carries out a process for releasing (deleting the unnecessary part) the rows less than X in the flow-in section I/O table 1124 in Step S6.

Next, the management computer 1100 checks whether or not the user or the other program instructs to End in Step S7.

When End is instructed, i.e., Yes in Step S7, the management computer 1100 releases the areas of the flow-in section I/O table 1124 and the flow-out section I/O table 1126 from the memory 1120 in Step S9 and ends the process.

Where no End instruction is given, i.e., No in Step S7, the management computer 1100 stands by for a certain period of time in Step S8. Note that this stand-by interval is time specified by the user on the monitoring condition setting screen 10500. After that, the management computer 1100 returns to Step S2.

Figure 14:
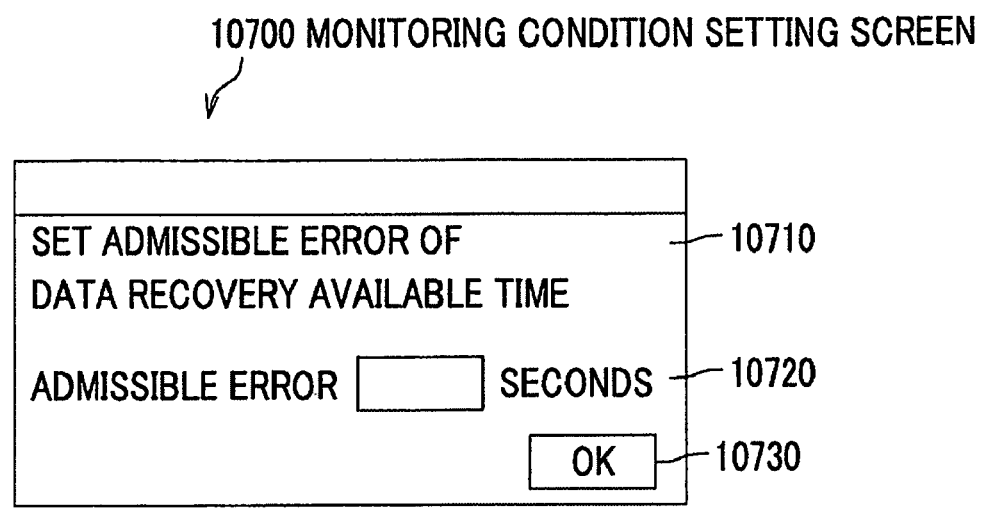
FIG. 14 shows a monitoring condition setting screen displayed by the management computer on the display unit to urge the user to set a permissible error of the data recovery available time.

It is noted that although the user sets the monitoring interval by using the monitoring condition setting screen 10500 shown in FIG. 10 in the present embodiment, the user may also use a monitoring condition setting screen 10700 shown in FIG. 14. FIG. 14 shows the monitoring condition setting screen 10700 displayed by the management computer 1100 on the display unit 1150 to urge the user to set a permissible error of the data recovery available time. Differences of the monitoring condition setting screen 10700 shown in FIG. 14 from the monitoring condition setting screen 10500 shown in FIG. 10 will be explained.

A message portion 107100 indicates a message urging the user to input the permissible error in monitoring the data recovery available time. It is possible to keep the error of time of the data recovery available time under the monitoring interval by estimating the data recovery available time by the method described above. Accordingly, the user may input the permissible error instead of the monitoring interval. In this case, the data recovery available time monitoring program 1112 handles the permissible error inputted by the user as a monitoring interval. A permissible error input portion 10720 displays a text box for accepting the input of the permissible error from the user. A button 10730 is an operation part that is clicked by the user after inputting the permissible error. Its process in the same with the case of FIG. 10, so that its explanation will be emitted here.

Thus, according to the storage system S of the embodiment, the management computer 1100 keeps the data at the inlet and outlet of the frames staying in the buffer 1318 of the storage device 1300A of the primary site 1700 at the certain monitoring interval, calculates the estimated value of the data recovery available time and displays it on the display unit 1150. Thereby, it becomes possible to provide the technology, also applicable to technologies other than the main frame technology, of monitoring the data recovery available time while suppressing the monitoring error within a certain range in the storage system S that performs the Asynchronous Remote Copy among the plurality of storage devices 1300. Still more, the management computer 1100 calculates not only the estimated value of the data recovery available time but also the estimated value of the data loss time period and displays it on the display unit 1150.

Further, according to the storage system S of the embodiment, the management computer 1100 can monitor the data recovery available time by using only the temporal information managed by the host computer 1200A of the primary site 1700, without using temporal information managed by the host computer 1200B and others of the remote site 1800, so that it becomes easy to operate and control the storage system S. Still more, because the monitoring error may be kept under the monitoring interval, the user can take an appropriate measure by changing a length of the monitoring interval or by increasing a capacity of the buffer 1318 when a free space of the buffer 1318 gets fewer than a certain amount. It is then possible to arrange such that the management computer 1100 indicates an alarm for example when the free space of the buffer 1318 gets fewer than the certain amount.

While the embodiment of the invention has been described above, the modes of the invention are not limited to those explained above. The present embodiment may be appropriately modified within a scope of the invention not departing from the gist of the invention with regard to its concrete structure such as hardware, programs and others. Variations of the present embodiment will be explained below.

5. Variations 5.1 Acquisition Information:

Although the sequence numbers of the frames existing at the inlet and outlet of the buffer 1318 are obtained in the present embodiment, the invention is applicable also to a case when the sequence number of the frame existing at the inlet of the buffer 1318 and a number of the frame staying within the buffer are obtainable. It is because the sequence number of the frame existing at the outlet of the buffer 1318 is obtainable through calculation using the two values described above. In the same manner, the invention is applicable also to a case when the sequence number of the frame existing at the outlet of the buffer 1318 and a number of the frame staying within the buffer are obtainable.

5.2 Dynamic Change of Monitoring Interval:

Although the user sets the monitoring interval in the presents embodiment, the management computer may also decide the monitoring interval.

When the data loss time period is short, an importance of the data recovery available time becomes low in general. Therefore, the monitoring interval may be prolonged when the data loss time period is small and the monitoring interval may be shortened when the data recovery available time is large. Thereby, it is possible to reduce the burden of the storage system S.

5.3 Location of Management Computer:

The management computer 1100 is coupled with the both host computer 1200A of the primary site 1700 and the host computer 1200B of the remote site 1800 in the present embodiment.

However, the invention may be carried by coupling the management computer 1100 only with the host computer 1200A of the primary site 1700 as described above. It is because information is acquired only from the host computer 1200A of the primary site 1700 in monitoring the data recovery available time in the state of the Pair 7110. This structure is suitable particularly when the primary site 1700 and the remote site 1800 are managed by different users (managers). For example, an enterprise system sometimes adopts a structure in which own company holds the primary site 1700 and a SSP (Storage Service Provider) provides the remote site 1800. In this case, the management computer 1100 can monitor the data recovery available time without collecting information from the remote site 1800.

However, it is unable to monitor the data recovery available time in the state of the Swapped Pair 7140 in the structure described above. Then, the management computers 1100A and 1000B are provided at the primary and remote sites 1700 and 1800, respectively, for example. Thereby, it becomes possible to monitor the data recovery available time by using the management computer 1100A of the primary site 1700 in the state of the Pair 7110 and to monitor the data recovery available time by using the management computer 1000B of the remote site 1800 in the state of the Swapped Pair 7140.

5.4 Cases when Host Computer is not Necessary:

Although the management computer 1100 acquires information necessary for calculating the data recovery available time by invoking the sequence number acquisition requesting program 1216 on the host computer 1200A of the primary site 1700 in the present embodiment, the invention may be also carried out by directly invoking the sequence number acquiring program 1340 on the storage device 1300A without going through the host computer 1200A. In this case, it is possible to acquire the temporal information by providing a time generator and a time acquisition program in the storage device 1300A and by utilizing them or by providing a time generator and a time acquisition program in the management computer 1100 and by utilizing them.

5.5 When there Exists a Plurality of Host Computers:

Note that when a plurality of host computers 1200A exists in the storage system S, it is conceivable that the data recovery available time may differ depending on each individual host computer 1200A. Therefore, when the management computer 1100 is coupled with the plurality of host computers, the management computer 1100 may acquire the data recovery available times from the plurality of host computers 1200A and may display the data recovery available time of each of the plurality of host computers 1200A. In this case, each of the plurality of host computers 1200A may be located not only in Japan but also abroad.

5.6 Others:

The certain time that has been the reference for calculating the data recovery available time may not be the current time and may be time at certain point of time in the past.

What is claimed is:

1. A storage system, comprising:
a first site having a first storage device and a first host computer for reading/writing data from/into the first storage device;
a second site having a second storage device and a second host computer for reading/writing data from/into the second storage device; and
a management computer for managing the first host computer of the first site,
wherein the first storage device performs Asynchronous Remote Copy from the first storage device of the first site to the second storage device of the second site,
wherein the management computer stores a sequence number as identification information of a current latest or quasi-latest data stored in a buffer of the first storage device of the first site with temporal information of the sequence number at each of certain monitoring intervals,
wherein the management computer calculates an estimated value of data recovery available time, which is a time at which data most recently stored in the second storage device of the second site that corresponds to data stored in the first storage device was stored in the first storage device, based on the temporal information stored by the management computer and based on a certain sequence number of a current earliest or quasi-earliest data or a quantity of the data stored in the buffer at a certain time, and
wherein the management computer displays the estimated value on a display section.

2. A storage system according to claim 1, wherein the management computer calculates a difference between the certain time and the data recovery available time as a data loss time period and displays the data loss time period on the display section.

3. A storage system according to claim 1, wherein the certain monitoring interval is a value set by the user in advance.

4. A storage system according to claim 1, wherein the calculation of the estimated value of the data recovery available time is performed by estimating time at which an earliest or quasi-earliest data is stored in the buffer at the certain time.

5. A method for calculating an estimated value of data recovery available time of a storage system that performs Asynchronous Remote Copy, the storage system comprising a first site having a first storage device and a first host computer for reading/writing data from/into the first storage device, a second site having a second storage device and a second host computer for reading/writing data from/into the second storage device, and a management computer for managing the host computer of the first site, the method comprising:
performing the Asynchronous Remote Copy from the first storage device of the first site to the second storage device of the second site;
storing a sequence number as identification information of a current latest or quasi-latest stored in a buffer of the first storage device of the first site with temporal information of the sequence number at each of certain monitoring intervals,
calculating an estimated value of data recovery available time, which is a time at which data most recently stored in the second storage device of the second site that corresponds to data stored in the first storage device was stored in the first storage device, based on the temporal information stored by the management computer and based on a certain sequence number of a current earliest or quasi-earliest data or a quantity of the data stored in the buffer at a certain time; and
displaying the estimated value on a display section.

6. A method according to claim 5, further comprising: calculating a difference between the certain time and the data recovery available time as a data loss time period and displays the data loss time period on the display section.

7. A method according to claim 5, wherein the certain monitoring interval is a value set by the user in advance.

8. A method according to claim 5, wherein the calculation of the estimated value of the data recovery available time is performed by estimating time when the earliest or quasi-earliest data is stored in the buffer at the certain time.

9. A management computer managing a first storage device and a second storage device being a copy destination of Asynchronous Remote Copy from the first storage device, the management computer comprising:

a memory storing a sequence number as identification information of a current latest or quasi-latest data stored in a buffer of the first storage device of the first site with temporal information of the sequence number at each of certain monitoring intervals, a processor calculating an estimated value of data recovery available time, which is a time at which data most recently stored in the second storage device of the second site that corresponds to data stored in the first storage device was stored in the first storage device, based on the temporal information stored by the management computer and based on a certain sequence number of a current earliest or quasi-earliest data or a quantity of the data stored in the buffer at a certain time; and a display section providing the estimated value.

10. A management computer according to claim 9, wherein the processor calculates a difference between the certain time and the data recovery available time as a data loss time period, and wherein the display section displaying the data loss time period.

11. A management computer according to claim 9, wherein the certain monitoring interval is a value set by the user in advance.

12. A management computer according to claim 9, wherein the calculation of the estimated value of the data recovery available time is performed by estimating time at which an earliest or quasi-earliest data is stored at the certain time.

* * * * *